United States Patent
Nakano et al.

(10) Patent No.: US 7,409,832 B2
(45) Date of Patent: Aug. 12, 2008

(54) GAS TURBINE POWER GENERATOR PLANT WITH MUTUALLY INDEPENDENT COOLING AIR CHANNELS FROM INTAKE TO EXHAUST

(75) Inventors: Susumu Nakano, Hitachi (JP); Masaya Ichinose, Hitachiota (JP); Masanori Watanabe, Chiyoda (JP); Kuniyoshi Tsubouchi, Mito (JP); Toshihiko Fukushima, Tsuchiura (JP); Masatoshi Watanabe, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 615 days.

(21) Appl. No.: 11/034,802

(22) Filed: Jan. 14, 2005

(65) Prior Publication Data

US 2005/0160740 A1    Jul. 28, 2005

(30) Foreign Application Priority Data

Jan. 15, 2004  (JP)  ............................. 2004-007602
Jan. 7, 2005   (JP)  ............................. 2005-002413

(51) Int. Cl.
    *F02C 7/20*  (2006.01)
(52) U.S. Cl. ........................................ 60/797; 60/39.83
(58) Field of Classification Search .................. 60/797, 60/806, 39.83
    See application file for complete search history.

(56) References Cited

U.S. PATENT DOCUMENTS

| | | | |
|---|---|---|---|
| 6,082,094 A * | 7/2000 | Longardner et al. | ............ 60/801 |
| 6,487,863 B1 * | 12/2002 | Chen et al. | ................... 60/782 |
| 6,574,966 B2 * | 6/2003 | Hidaka et al. | .................. 60/806 |
| 6,691,503 B2 * | 2/2004 | Tiemann | ..................... 60/39.17 |
| 6,840,049 B2 * | 1/2005 | Ziegner | ........................ 60/782 |
| 7,036,318 B1 * | 5/2006 | Munson, Jr. | .................. 60/776 |
| 2002/0148214 A1 * | 10/2002 | Tiemann | ..................... 60/39.17 |
| 2003/0033817 A1 * | 2/2003 | Huster et al. | ................... 60/797 |
| 2003/0061796 A1 * | 4/2003 | Kaijima et al. | ........... 60/39.182 |
| 2004/0020213 A1 * | 2/2004 | Jones | ........................... 60/772 |
| 2006/0005546 A1 * | 1/2006 | Orlando et al. | ............... 60/782 |

FOREIGN PATENT DOCUMENTS

JP    2002-242698    8/2002

* cited by examiner

*Primary Examiner*—William H Rodriguez
(74) *Attorney, Agent, or Firm*—Mattingly, Stanger, Malur & Brundidge, P.C.

(57) ABSTRACT

A gas turbine power generator plant, intended to reduce its noise by making small the intake and exhaust outlets of the cooing air channel of a case, comprises an engine core in which a turbine, a compressor and a generator are installed on the same axis, a combustor for burning air for combustion compressed by the compressor and supplying the air to the turbine, a radiator for cooling a coolant or a lubricant, a cooling fan for ventilating the radiator with cooling air, an electric power converter for converting electric power generated by the generator, and the case for housing these constituent elements. And, a combustion air channel passing the compressor, the combustor and the turbine and a cooling air channel passing the radiator, the cooling fan and the electric power converter are formed as mutually independent channels from intake to exhaust.

11 Claims, 11 Drawing Sheets

GAS TURBINE POWER GENERATOR PLANT WITH MUTUALLY INDEPENDENT COOLING AIR CHANNELS FROM INTAKE TO EXHAUST

BACKGROUND OF THE RELATED ART

The present invention relates to a gas turbine power generator plant and a silencer for use in the same.

DESCRIPTION OF THE RELATED ART

Among conventional silencers for gas turbines, there is one described in JP-A-2002-242698. The configuration of this silencer comprises a soundproof enclosure having an air inlet opening in its front wall and a closed space formed inside, a gas turbine which is disposed within the soundproof enclosure and to which is connected an exhaust pipe for discharging exhaust gas outside the soundproof enclosure, a plurality of silencing splitter pipes arranged within the soundproof enclosure and close to the gas turbine to form inside an air intake silencing gap communicating with both ends of which one faces the air intake opening side and the other is terminated facing a rear wall opposite the front face, a sound-absorbing exhaust passage which is connected to an air exhaust opening disposed in the soundproof enclosure, is installed in the upper part of the soundproof enclosure and absorbs sound while guiding air for exhaust, and an exhaust fan connected to the sound-absorbing exhaust passage to suck and discharge air in the soundproof enclosure.

In recent years, gas turbine power generator plants have come to attract attention on account of dramatic reductions in the overall external dimensions of the plants by virtue of the availability of more compact gas turbines and their low NOx emission and resultant friendliness to the global environment. Furthermore, as deregulation of the electric power market has come to permit retailing of electric power obtained by such gas turbine power generator plants, it is contemplated to use gas a turbine power generator plant as a distributed power generator plant. In order for a gas turbine power generator plant to be extensively installed in commercial establishments including convenience stores and family restaurants, hospitals, factories, hotels and the like as a distributed power generator plant, a gas turbine power generator plant of low noise especially toward the outside (surroundings) of the case are required.

Whereas the above patent publication disclosed noise reduction by the use of a soundproof enclosure, it is apt to emit loud noise toward the outside of the case because the case has a common intake for the air for combustion use by the gas turbine and the air for cooling the turbine engine and therefore a large opening is formed in the case.

BRIEF SUMMARY OF THE INVENTION

An object of the present invention is to provide a gas turbine power generator plant capable of reducing noise by making small the air intake and the exhaust outlet of the cooling air channel of the case.

Another object of the invention is to provide a silencer for gas turbine power generator plants, which is able to reduce noise in not only a wide band from low frequency to high frequency but also in a specific frequency band.

In order to achieve the object stated above, a gas turbine power generator plant according to the invention comprises an engine core provided with a generator, a turbine and a compressor on the same axis; a combustor for burning air for combustion compressed in the compressor and supplying the air to the turbine; a radiator for cooling a bearing lubricant by heat exchange with air; a cooling fan for ventilating the radiator with cooling air; an electric power converter for converting electric power generated in the generator to a commercial frequency; and a case for housing these constituent elements, wherein a combustion air channel passing the compressor, the combustor and the turbine and a cooling air channel passing the radiator, the cooling fan and the electric power converter are formed as mutually independent channels from intake to exhaust.

In the invention described above, the following configurations are more preferable.

(1) An intake silencer is installed on the intake side of the combustion air channel of the engine core.

(2) An exhaust silencer is installed on the exhaust side of the combustion air channel of the engine core.

(3) The inside of the case is divided by a partitioning plate into an upper space and a lower space, the engine core is arranged in the upper space, the cooling fan is arranged in the lower space, and the air intake and exhaust outlet of the cooling air channel are formed in the upper part of the case.

(4) The radiator, the cooling fan and the electric power converter are arranged in parallel in the lower space, and the cooling air channel is so formed that cooling air flows through the generator in the upper space, the radiator in the lower space, the cooling fan and the electric power converter in that order.

(5) The electric power converter, the radiator and the cooling fan are arranged in the lower space, and the cooling air channel is so formed that cooling air flows through the generator in the upper space, the electric power converter in the lower space, the radiator and the cooling fan in the lower space in that order.

(6) A reactor or a transformer which is a constituent part of the electric power converter is arranged immediately before the upstream side of the radiator.

(7) A reactor or a transformer which is a constituent part of the electric power converter is arranged immediately behind the downstream side of the cooling fan.

(8) The upper space is divided by a heat shield plate into a first upper space and a second upper space side by side, the generator is arranged in the first upper space, an intake for cooling air is formed in the upper part of the case constituting the first upper space, the turbine is arranged in the second upper space, and an exhaust outlet for cooling air is formed in the upper part of the case constituting the second upper space.

(9) The-second upper space is partitioned by a partitioning plate into a small auxiliary equipment chamber for arranging small auxiliary equipments and a turbine side space for arranging the turbine, and the cooling air channel is branched into a channel passing the small auxiliary equipment chamber and a channel passing the turbine side space.

(10) The small auxiliary equipment chamber is divided by a shelf into a plurality of small auxiliary equipment chambers, and an opening is so formed in the shelf that cooling air flows in series through this plurality of small auxiliary equipment chambers.

(11) An intake silencer is installed in the combustion air channel on the intake side of the engine core, the duct of the intake silencer is formed in a bent shape and, by dividing the inside of the duct of the intake silencer on the intake side with partitioning plates into two combustion air channels, the route length of each combustion air channel is differentiated.

(12) The duct of the intake silencer is bent substantially at a right angle, sound absorbers are provided on both inner sides of each of the divided combustion air channels of the duct, and the surfaces of these two sound absorbers are shaped in matching concave and convex with substantially equal distances between them.

In order to achieve another object, a silencer for gas turbine power generator plants according to the invention is to be installed in the combustion air channel of the engine core of a gas turbine power generator plant, and formed by bending a duct constituting the combustion air channel substantially at a right angle, and, the duct is divided on the downstream side with respect to the noise source by a partitioning plate into two combustion air channels, so as to differentiate the route length of each combustion air channel, sound absorbers are provided on both sides of the insides of the divided combustion air channels of the duct, and the surfaces of both these sound absorbers are shaped in matching concave and convex with substantially equal distances between them.

According to the invention, as the combustion air channel passing the compressor, the combustor and the turbine and the cooling air channel passing the radiator, the cooling fan and the electric power converter are formed as mutually independent channels from intake to exhaust, it is possible to provide a gas turbine power generator plant capable of suppressing noise by making small the air intake and exhaust outlet of the cooling air channel of the case.

With the preferable configuration of the invention, since the intake silencer is installed on the intake side of the combustion air channel of the engine core, noise-leaking out of the air intake of the combustion air channel of the engine core can be reduced.

Furthermore, as the exhaust silencer is also installed on the exhaust side of the combustion air channel of the engine core, noise leaking out of both the air intake and the exhaust outlet of the combustion air channel of the engine core can be reduced, resulting in a significant reduction in the noise arising in the combustion air channel system.

With the preferable configuration of the invention, since the inside of the case is divided by the partitioning plate into the upper space and the lower space, the engine core is arranged in the upper space, the cooling fan is arranged in the lower space, and the air intake and exhaust outlet of the cooling air channel are formed in the upper part of the case, the cooling fan can be arranged in a position away from the air intake and the exhaust outlet of the cooling air channel, and the noise of the cooling fan, which is a major noise source in the cooling air channel, can be substantially reduced relative to outside the case.

Furthermore, as the radiator, the cooling fan and the electric power converter are arranged in parallel in the lower space, and the cooling air channel is so formed that cooling air flows through the generator in the upper space, the radiator in the lower space, the cooling fan and the electric power converter in that order, the-cooling fan, which is a noise source, can be arranged in the farthest position from the air intake and the exhaust outlet of the cooling air channel, and the radiator and the electric power converter on the two sides of the can cooling fan can provide noise shielding.

Moreover, as the electric power converter, the radiator and the cooling fan are arranged in parallel in the lower space, and the cooling air channel is so formed that cooling air flows through the generator in the upper space, the radiator in the lower space and the cooling fan in that order, the cooling fan, which is a noise source, can be arranged in the farthest position from the air intake and the exhaust outlet of the cooling air channel. Further, by installing electric equipments which are constituent parts of the electric power converter upstream from the radiator, it is possible to keep the ambient temperature around the electric equipments equal to the external atmosphere, and thereby to secure the reliability of the electric power converter.

Furthermore, as the upper space is divided by the heat shield plate into the first upper space and the second upper space side by side, the generator is arranged in the first upper space, the intake for cooling air is formed in the upper part of the case constituting the first upper space, the turbine is arranged in the second upper space, and the exhaust outlet for cooling air is formed in the upper part of the case constituting the second upper space, the combustion air channel and the cooling air channel can be configured in a simple structure, and noise from the cooling air channel relative to outside the case can be further reduced.

Moreover, since the second upper space is partitioned by the partitioning plate into the small auxiliary equipment chamber for arranging small auxiliary equipments and the turbine side space for arranging the turbine, and the cooling air channel is branched into the channel passing the small auxiliary equipment chamber and the channel passing the turbine side space, the small auxiliary equipment chamber can be configured in a simple structure. And, as the small auxiliary equipment chamber is divided by the shelf into a plurality of small auxiliary equipment chambers, and the opening is so formed in the shelf that cooling air flows in series through this plurality of small auxiliary equipment chambers, the cooling effect can be enhanced while improving the capability of the small auxiliary equipment chamber to accommodate small auxiliary equipments.

With the preferable configuration of the invention, since the intake silencer is installed in the combustion air channel on the intake side of the engine core, the duct of the intake silencer is formed in a bent shape and, the duct on the intake side of the intake silencer is-divided by partitioning plates into two combustion air channels, so as to differentiate the route length of each combustion air channel, noise can be reduced in not only a wide band from low frequency to high frequency but also in a specific frequency band.

Furthermore, the duct of the intake silencer is bent substantially at a right angle, sound absorbers are provided on both sides of the insides of the divided combustion air channels of the duct, and the surfaces of both these sound absorbers are shaped in matching concave and convex with substantially equal distances between them, noise can be further reduced.

Since according to the invention the duct constituting the combustion air channel is bent substantially at a right angle, the duct on the downstream side with respect to the noise source is divided by the partitioning plate into two combustion air channels and the route length of each combustion air channel is differentiated, the sound absorbers are provided on both sides of the insides of the divided combustion air channels of the duct, and the surfaces of both these sound absorbers are shaped in matching concave and convex with substantially equal distances between them, it is made possible to provide a gas turbine power generator plant which can reduce noise in not only a wide band from low frequency to high frequency but also in a specific frequency band.

Other object, features and advantages of the invention will become apparent from the following description of the embodiments of the invention taken in conjunction with the accompanying drawings.

DETAILED DESCRIPTION OF THE INVENTION

A gas turbine power generator plant according to one embodiment of the invention will be described by using drawings.

Figure 1:
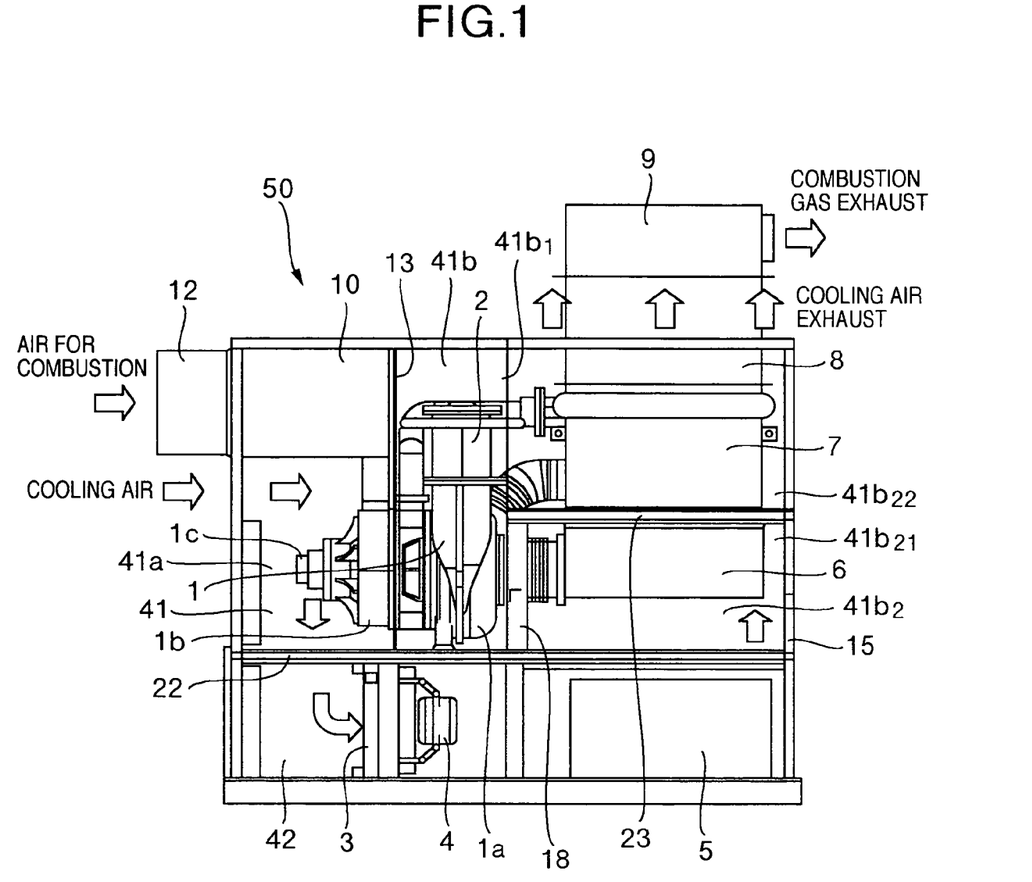
FIG. 1 is a schematic vertical section of a gas turbine power generator plant according to one embodiment of the invention.
Figure 2:
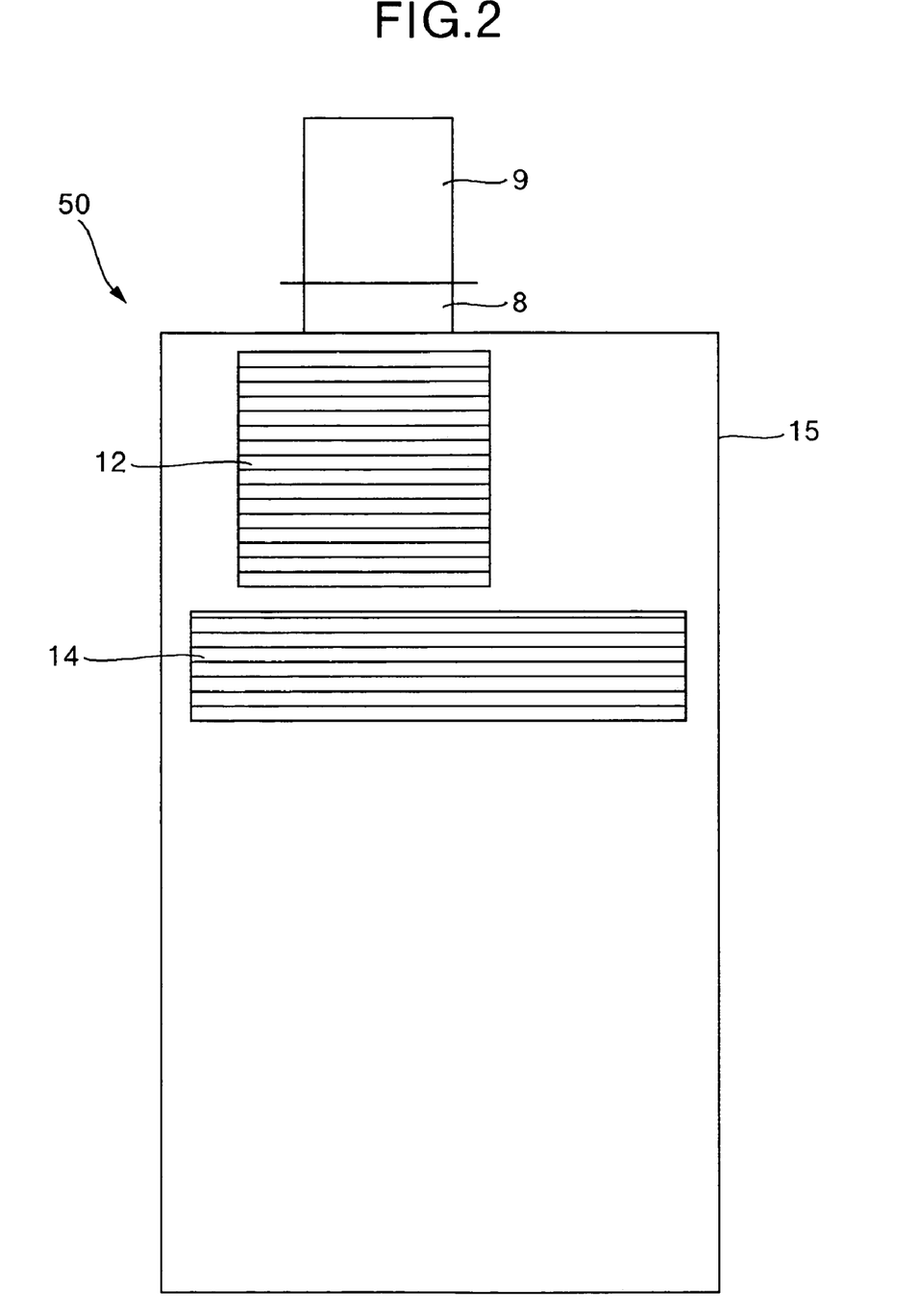
FIG. 2 is a left side profile of the embodiment in FIG. 1.
Figure 3:
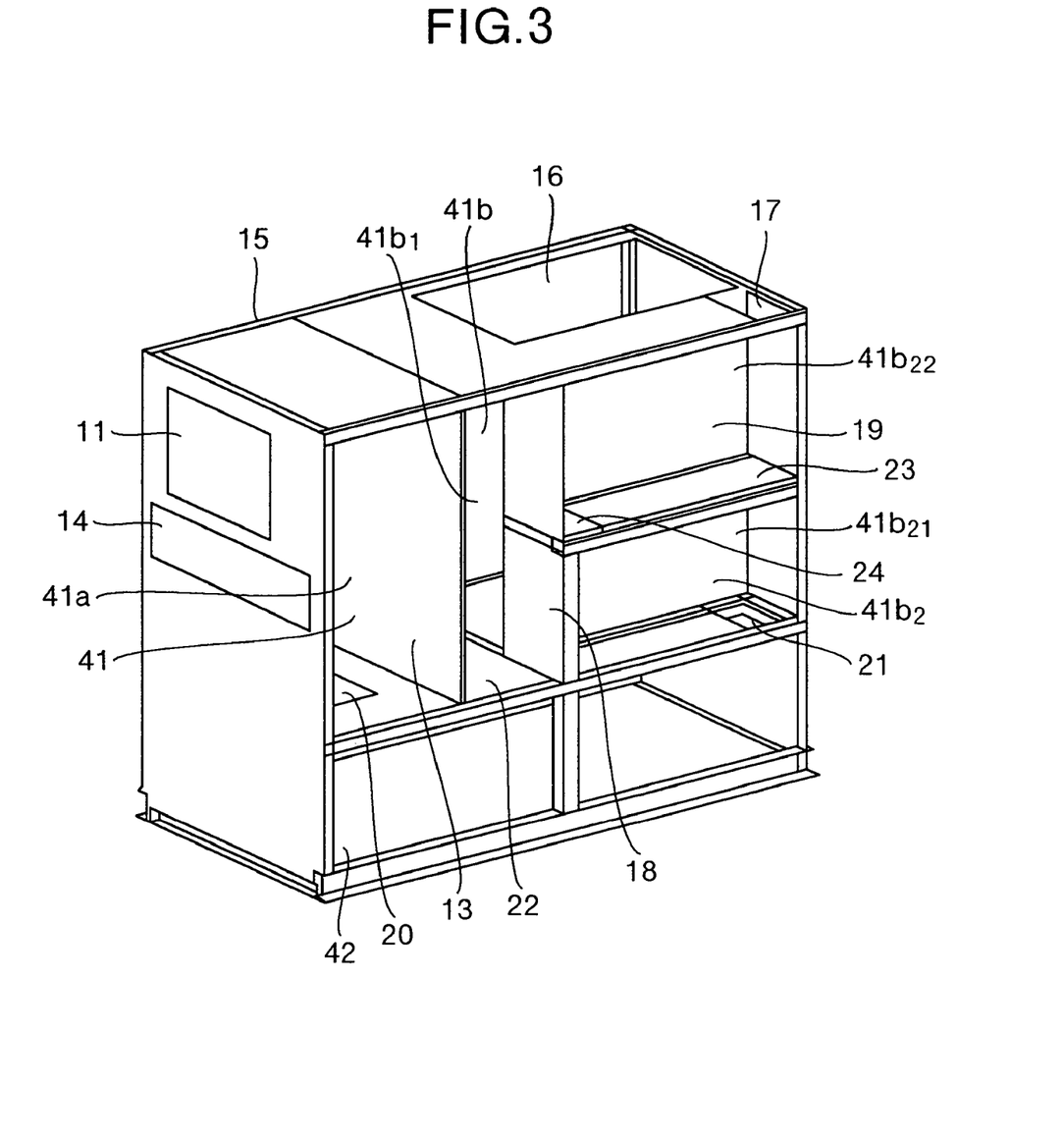
FIG. 3 is a perspective view of the casing by itself of the gas turbine power generator plant in FIG. 1.
Figure 4:
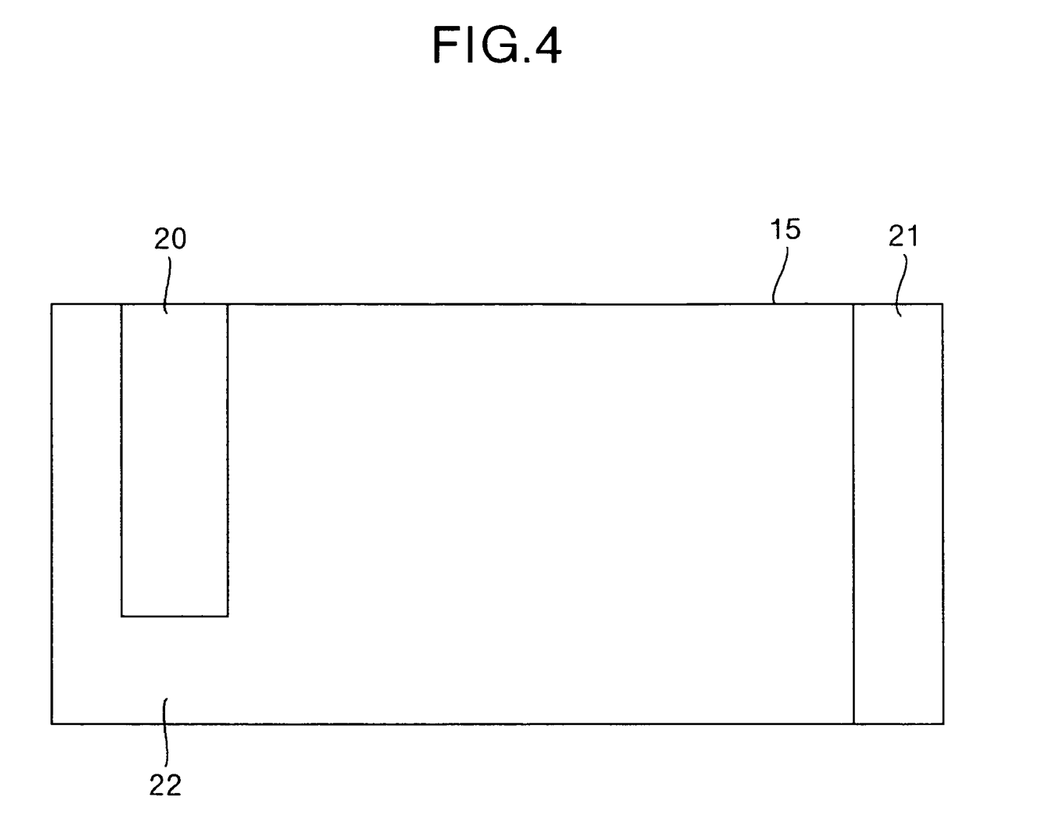
FIG. 4 is a plan view of the engine core base of the case in FIG. 3.

First, a gas turbine power generator plant 50 in this embodiment will be described with reference to FIG. 1 through FIG. 4. FIG. 1 is a schematic vertical section view of a gas turbine power generator plant according to one embodiment of the invention; FIG. 2, a left side profile of the embodiment in FIG. 1; FIG. 3, a perspective view of the casing by itself of the gas turbine power generator plant in FIG. 1; and FIG. 4, a plan view of the engine core base of the case in FIG. 3. Incidentally, FIG. 3 shows the case in a state in which a front board is removed.

The gas turbine power generator plant 50, as shown in FIG. 1, has a configuration mainly having within a case 15 an engine core 1, a combustor 2, a radiator 3, a cooling fan 4, an electric power converter 5, an exhaust duct 6, and a regenerative heat exchanger 7. The radiator 3 is installed to cause the lubricant of bearings and the cooling agent of the generator to exchange heat with cooling air led in from outside the case and thereby to cool them.

The case 15, as shown in FIG. 3, is formed in a rectangular shape smaller in the back-and-forth direction and larger laterally, wherein intake side openings 11 and 14 are formed in a side face and exhaust side openings 16 and 17 in the top face. Heat-insulating and sound-absorbing materials are stuck to inside faces of the case 15. The inside of the case 15 is partitioned into a plurality of spaces by partitioning plates 13, 18, 19, 22, 23 and so forth. These spaces so communicate with one another that a prescribed air channel is formed by openings 20, 21, 24 and so forth formed in the partitioning plates. The partitioning plates 13, 18, 19, 22 and 23 are configured of members having heat-insulating and sound-absorbing functions or members to which members having these functions are stuck.

The openings 11 and 14 are formed in the upper part of one side face of the case 15, one positioned above the other. The opening 11 is intended for letting air for combustion enter the case 15 through an air filter 12 (see FIG. 1). The air filter 12, intended for removal of dust and the like in the air, is fitted to the outside of the opening 11 in which the air filter 12 is installed, and has in a side a ventilation port-for letting in air for combustion. The gap between the opening 11 and the air filter 12 is sealed with a packing or the like in a configuration not to let inside noise leak outward. The opening 14 is intended for leading cooling air into the case 15. The ventilation port of the air filter 12 and the opening 14 are formed of louvers in which many crosspieces are formed.

On the other hand, the openings 16 and 17 are formed in the other side of the top face of the case 15 (i.e., the position away from the side in which there are the opening 11 and the opening 14). These openings 16 and 17 constitute the exhaust outlet for cooling air.

The internal space of the case 15 is partitioned by the partitioning plate 22 into upper and lower parts to form an upper space 41 and a lower space 42. Incidentally, the partitioning plate 22 constitutes the base of the engine core 1. The upper space 41 is partitioned into left and right parts by the partitioning plate 13 disposed perpendicularly to form a left upper space 41a (first upper space) and a right upper space 41b (second upper space). The partitioning plate 13 constitutes a heat shield plate. Its right upper space 41b is further partitioned by the partitioning plates 18 and 19 to form a turbine side space $41b_1$, and a small auxiliary equipment chamber $41b_2$. In the small auxiliary equipment chamber $41b_2$, there are arranged small auxiliary equipments including, for instance, a control device or gas piping for feeding fuel to the combustor 2, a gas shut-off valve and a flow meter. Where water jet is to be sprayed on the intake side and the outlet side of the compressor constituting the engine core 1 to increase the turbine output, a water jet tank, a water jet pump and valves to be provided on their piping, among other equipments, are arranged. And the small auxiliary equipment chamber $41b_2$ is partitioned by the partitioning plate 23 into a plurality of vertically arranged spaces (in the illustrated example, a lower small auxiliary equipment chamber $41b_{21}$ and an upper small auxiliary equipment chamber $41b_{22}$). The partitioning plate 23 constitutes a shelf.

The left upper space 41a communicates with outside via the opening 14 and also communicates with one side of the lower space 42 via the opening 20. The right upper space 41b communicates with the other side of the lower space 42 via the opening 21. In other words, the turbine side space $41b_1$ and the small auxiliary equipment chamber $41b_2$ communicate with the other side of the lower space 42 via the opening 21. The turbine side space $41b_1$ communicates with outside via the opening 16. The small auxiliary equipment chamber $41b_2$ communicates with outside via the opening 17. A lower small auxiliary equipment chamber $41b_{21}$ and an upper small auxiliary equipment chamber $41b_{22}$ are enabled to communicate with each other by the opening 24 of the partitioning plate 23. This opening 24 is provided in an opposite position to the openings 21 and 17.

This configuration results in the formation of a substantially U-shaped cooling air channel consisting of the left upper space 41a, the lower space 42 and the right upper space 41b within the case 15. This cooling air channel has the opening 14 as its air intake and the openings 16 and 17 as its exhaust outlets to constitute a line along which cooling air flows from the air intake 14 to the exhaust outlets 16 and 17 independently from the combustion air channel.

As shown in FIG. 1, the engine core 1 is arranged in the central part of the upper space 41 within the case 15. The engine core 1 is provided with a turbine 1a, a compressor 1b and a generator 1c, and the turbine 1a, the compressor 1b and the generator 1c are installed on the same axis in this order. The turbine 1a and the compressor 1b are connected by the regenerative heat exchanger 7 and the combustor 2. The generator 1c and the compressor 1b are partitioned from the turbine 1a by the partitioning plate 13 to the left and the right. The generator 1c and the compressor 1b are arranged within the left upper space 41a, and the turbine 1a and the combustor 2 are arranged within the right upper space 41b (the turbine side space $41b_i$).

An air intake channel consisting of an intake silencer 10 and the air filter 12 is installed on the intake side of the compressor 1b. The intake silencer 10, arranged in the upper part of the left upper space 41a, is connected between the air filter 12 and the compressor 1b via the opening 11. On the other hand, an exhaust channel consisting of the exhaust duct 6, the regenerative heat exchanger 7, an exhaust silencer 8 and a silencing chamber 9 is installed on the exhaust side of the turbine 1a. Therefore, a combustion air channel composed of the air filter 12, intake silencer 10, compressor 1b, regenerative heat exchanger 7, combustor 2, turbine 1a, exhaust duct 6, regenerative heat exchanger 7, exhaust silencer 8 and silencing chamber 9 in that order is formed independent of the cooling air channel.

Water or other coolant (cooling agent) used for cooling the generator 1c and the lubricant for bearings are circulated in the lower space 42 within the case 15, wherein the radiator 3, the cooling fan 4 and the electric power converter 5 for exchanging heat with the air led in from outside the case by the cooling fan 4 are installed. The radiator 3 is arranged on the suction side of the cooling fan 4 and farther downstream than the generator 1c. The electric power converter 5, constituting a large auxiliary equipment, is arranged on the discharge side of the cooling fan 4. As the lower space 42 effectively utilizes the planar area, the radiator 3, the cooling fan 4 and the electric power converter 5 can be easily installed in this order. Further, by arranging the engine core 1 in the upper space 41 and arranging the radiator 3, the cooling fan 4 and the electric power converter 5 in the lower space 42, noise from the cooling fan 4 can be intercepted in a compact structure.

Next will be described the operations of this gas turbine power generator plant.

Air for combustion is sucked through the air intake of the air filter 12; after being cleared of dust and the like by the air filter 12, it is sucked through the opening 14 into the compressor 1b of the engine core 1 via the intake silencer 10, and is compressed by the compressor 1b to high pressure. The compressed air for combustion is fed to the combustor 2 and, together with a fuel separately fed, burnt by the combustor 2 into high-temperature combustion gas. This combustion gas, after being expanded by the turbine 1a, discharged into the connected piping as exhaust gas through the exhaust duct 6, the regenerative heat exchanger 7, the exhaust silencer 8 and the silencing chamber 9.

As described above, by forming the combustion air channel within the case 15 independently of the cooling air channel and installing the silencers 10 and 8 and the silencing chamber 9 on the intake and exhaust sides of the engine core 1, noise reduction in the combustion air-channel can be readily achieved.

And, when the engine core 1 is operated, the turbine 1a, the compressor 1b and the generator 1c installed on one axis are turned at high speed, and the generator 1c generates electricity. The generated electric power, after being converted to a commercial frequency by the electric power converter 5, is supplied outside.

To add, as the temperature of the exhaust gas from the regenerative heat exchanger 7 is high, it is possible to recover exhaust heat from its exhaust energy with a separately installed absorption-type refrigerating machine or the like for use in cooling/heating, air conditioning or the like and thereby effectively utilize the exhaust heat.

The cooling air is sucked through the opening 14 by the operation of the cooling fan 4 and, after being raised in temperature by cooling the surface of the generator 1c, reaches the radiator 4 past the opening 20 to be cooled by the cooling fan 4. This cooling air, after cooling the electric power converter 5 installed on the discharge side of the cooling fan 4, reaches the right upper space 41b through the opening 21.

The cooling air is divided into two lines from the opening 21 onward. One is a line that reaches the turbine side space $41b_1$ and opens into the atmosphere through the opening 16 in the ceiling of the case 15 while cooling the surroundings of the exhaust duct 6, the regenerative heat exchanger 7 and the exhaust silencer 8. The other is a line that reaches the small auxiliary equipment chamber $41b_2$ and opens into the atmosphere through the opening 17 while cooling the small auxiliary equipments.

As the partitioning plate 13, which is a heat shield plate, is provided between the compressor 1b and the turbine 1a of the engine core 1 over the base 22, it is possible to prevent the heat of the turbine 1a and the combustor 2 from raising the temperature of the generator 1c. Also, since small auxiliary equipments are arranged in the small auxiliary equipment chamber $41b_2$ partitioned from the turbine side space $41b_1$ by the partitioning plates 18 and 19, it is possible to prevent the heat of the turbine 1a and the combustor 2 from raising the temperature of the small auxiliary equipments.

Further, a shelf 23 on which to install the small auxiliary equipments is fitted to the small auxiliary equipment chamber $41b_2$ surrounded by the partitioning plates 18 and 19, and has the opening 24. Here, the openings 21, 24 and 17 are staggered in position as shown in FIG. 3. This serves to uniformize the air flowing within the lower small auxiliary equipment chamber $41b_{21}$ and the upper small auxiliary equipment chamber $41b_{22}$ partitioned by the shelf 23, and the small auxiliary equipments installed within are uniformly cooled and ventilated.

The main constituents of noise from the gas turbine power generator plant 50 comprise aerodynamic noise due to the revolutions of the compressor 1b and the turbine 1a generated within the engine core 1, radiant noise radiating from the engine core 1 excited by vibration or the like, and vane noise generated by the cooling fan 4 ventilating the inside of the case 15. In this embodiment, the aerodynamic noise from within the engine core 1 is reduced by the intake silencer 10, the exhaust silencer 8 and the silencing chamber 9, and the radiant noise from the engine core 1 and vane noise from the cooling fan 4 are reduced by acoustic shielding or sound absorption by the case 15.

In this embodiment, the engine core 1 and the cooling fan 4, which are among the sources of noise, are installed in the central part of the case 15, namely in positions far from the openings 14, 16 and 17 constituting the air intake and the exhaust outlet. This enables the effects of distance attenuation from the engine core 1 and the cooling fan 4 to the openings 14, 16 and 17 and of internal diffraction and shielding, and the radiant noise from the openings 14, 16 and 17 to be reduced.

Shielding against the radiant noise from the engine core 1 is achieved by the heat shield plate 13.

Regarding openings in the case 15, only the air intake of the air filter 12 and the exhaust outlet of the silencing chamber 9 are used for air for combustion, and only the opening 14 and the openings 16 and 17 are used for cooling air. Thus, each type of the suction/exhaust lines of air is made independent of the other. As this enables the opening area of the case 15 to be reduced, noise can be effectively reduced. Incidentally, though FIG. 1 shows a configuration in which the channel of cooling air is equipped with the radiator 3, the invention can as well be applied to a gas turbine power generator plant equipped with no radiator.

Figure 5:
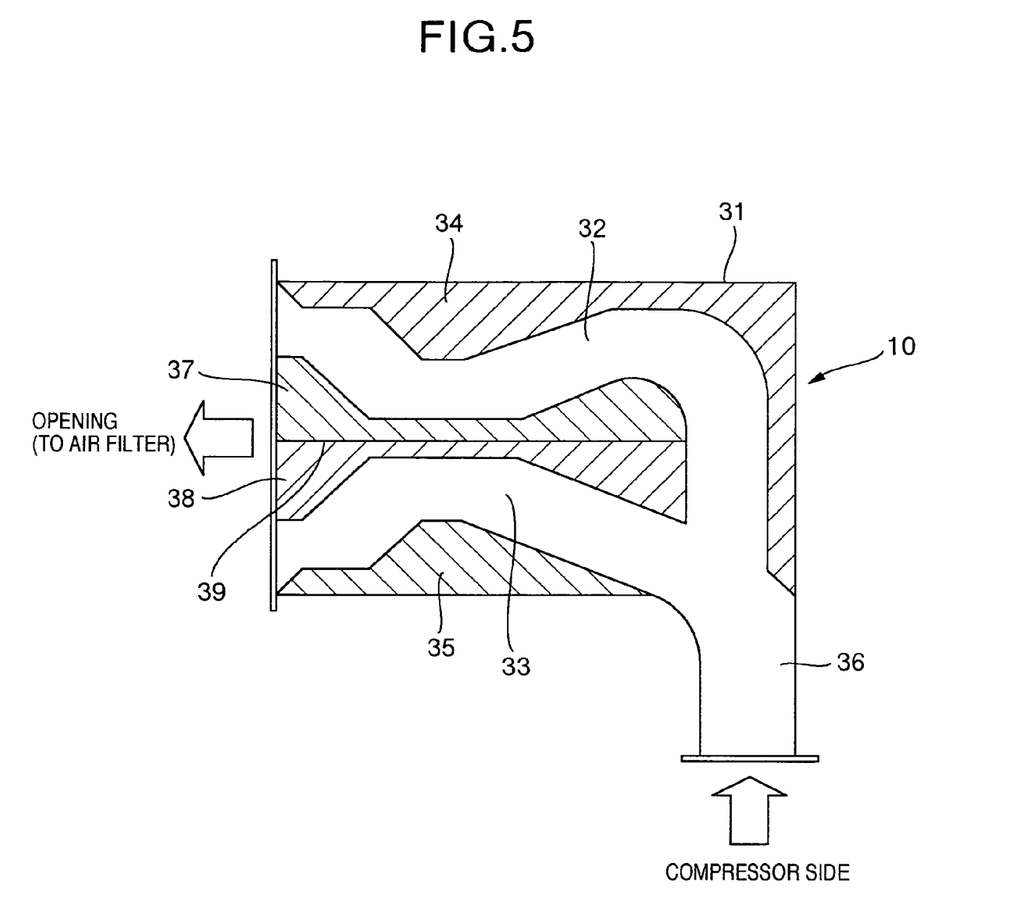
FIG. 5 is a section view of an intake silencer in FIG. 1.
Figure 6:
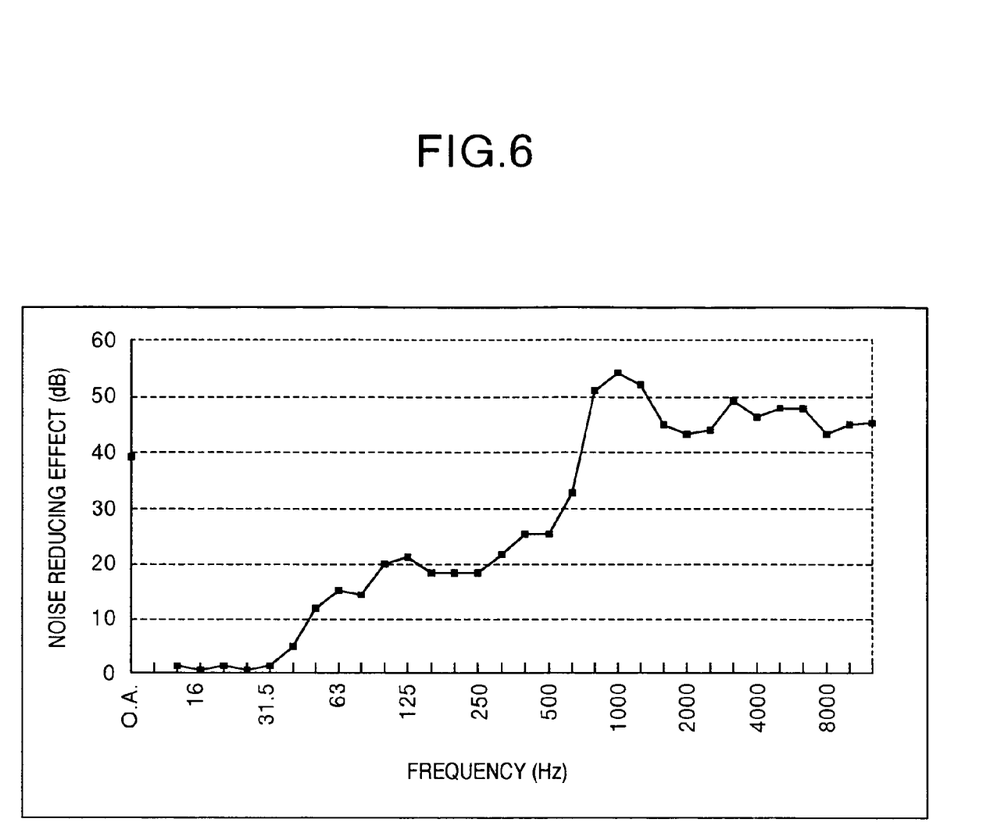
FIG. 6 is a characteristics diagram showing the noise reducing effect of the intake silencer in FIG. 1.

Next, details of the intake silencer 10, which is a silencing device, will be described with reference to FIG. 5 and FIG. 6. FIG. 5 is a section of the intake silencer in FIG. 1, and FIG. 6 is a characteristics diagram showing the noise reducing effect of the intake silencer.

As shown in FIG. 5, the intake silencer 10 is composed by dividing a bent duct 31 with a partitioning plate 39 into two stages, upper and lower. On the upper and lower sides of the upper duct portion, there are installed convex and concave sound absorbers 34 and 37. In the lower duct portion, there are installed convex and concave sound absorbers 38 and 35. As this structure causes the acoustic wave coming incident from the openings on the noise source side to be branched from a channel 36 into an upper stage channel 32 and a lower stage channel 33, a routing difference arises between the channel 32 and the channel 33, and the resultant phase difference can attenuate noise in specific frequency bands by acoustic wave interference. Furthermore, the configuration comprising a plurality of channels can reduce a plurality of frequency bands. Also, as the route difference between the channel 32 and the channel 33 can be easily made variable, the frequency bands that allow reductions can be readily shifted. Therefore, by varying the route difference according to the frequencies of the noise sources of the applicable gas turbine power generator plant 50, desired frequency bands can be reduced.

The sound absorber 34 has a trapezoidal shape in the upper duct portion and a semicircular shape at the bend, while the sound absorber 37 has a shape reverse to the concave/convex shape of the sound absorber 34, resulting in a shaping in which the width of the channel 32, namely the distance between the sound absorber 34 and the sound absorber 37 is substantially constant. Also, the height of the sound absorber 34 from the top is either on the same plane as the height of the sound absorber 37 from the bottom or greater than that, namely the two heights slightly overlapping each other. And the same structure as the above-described one is true of the sound absorbers 38 and 35 of the lower stage duct. As this enables the pressure loss in the bend between the upper duct portion and the lower duct portion to be reduced and no direct noise from the noise sources radiates through the radiation side openings, noise in a wide band can be reduced. To add, the noise absorbers are prevented from peeling off by fixing the surface of each noise absorber with punching metals. Further, glass wool, rock wool, urethane or the like is used for the noise absorbers.

This noise reducing effect will be described with reference to FIG. 6. In FIG. 6, the axis of abscissa represents the frequency and the axis of ordinate, the noise reducing effect. Here is shown the result of measuring differences in noise level between the noise source side opening and the radiation side opening of the intake silencer 10 by having a non-directional loudspeaker generate white noise and bringing it into incidence from the noise source side opening. It is seen that the noise reducing effect was about 40 dB at O.A., a reducing effect of 20 dB or more was achieved in a wide band of or above 125 Hz, and a significant reducing effect was obtained particularly in specific frequencies from 800 Hz to 1200 Hz. Incidentally, though the duct shape of the intake silencer 10 shown in FIG. 5 is one of being bent substantially at a right angle, the duct shape may as well be linear if there can still be a route difference between the channel lengths divided by the partitioning plate 39 installed within the duct. Also, though the inside of the duct of the intake silencer 10 is divided into two by the partitioning plate 39 as it is shown in FIG. 5, it can be divided into a greater plurality of channels.

As is evident from the foregoing, in the silencer of this embodiment, the structure of not letting direct noise to be irradiated through openings makes possible reductions in a wide band, and at the same time reductions in specific frequencies are made possible by providing a route difference between the two stages, upper and lower, of the duct.

Incidentally, the gas turbine power generator plant of this embodiment can be applied to a type in which a turbine core comprising a turbine, a generator and so forth and electrical equipments including an electric power converter and so forth are arranged in a single package. It is highly suitable for low output types, for instance, micro-turbines.

Figure 7:
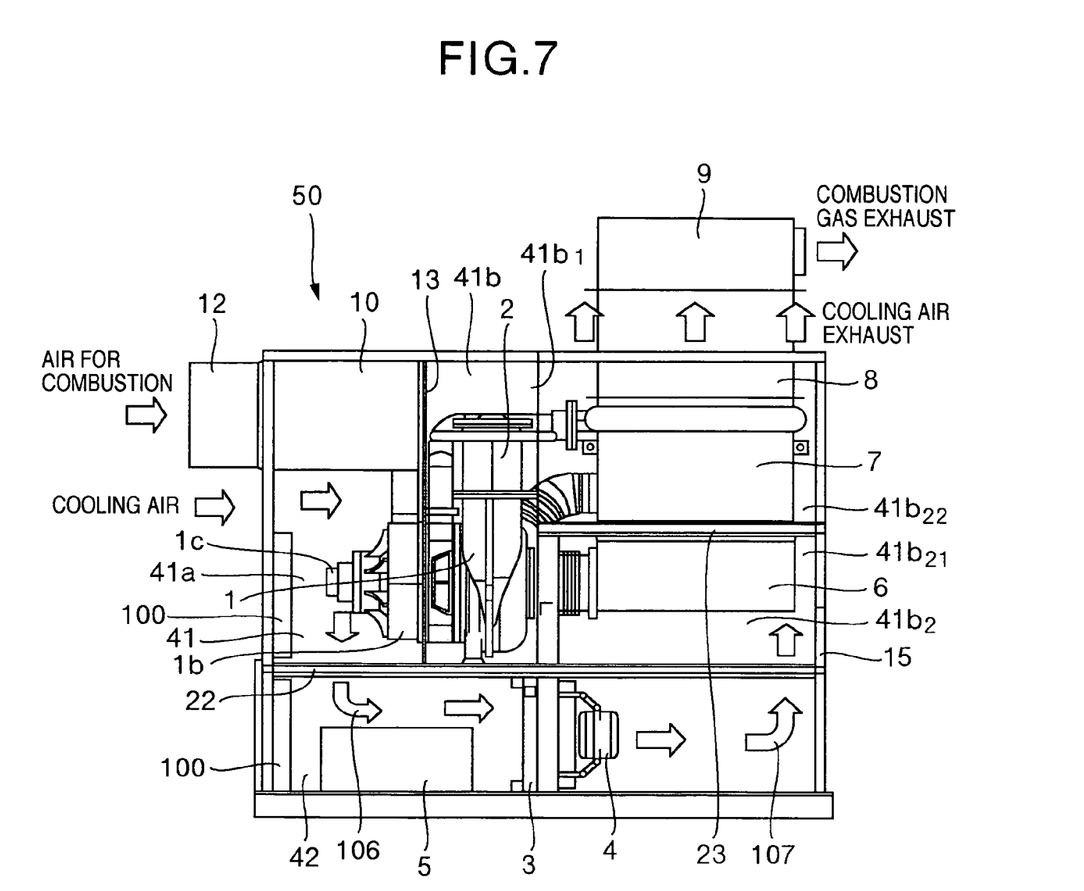
FIG. 7 is a schematic vertical section view of a gas turbine power generator plant according to another embodiment of the invention.

FIG. 7 is a diagram showing another embodiment of the invention. This embodiment differs from the embodiment of FIG. 1 in the component arrangement in the lower space 42 within the case 15. Thus, in this embodiment, the components to be arranged in the lower space 42 are installed in the order, from the upstream side downward, the electric power converter 5, the radiator 3 and the cooling fan 4 as viewed in the flowing direction of cooling air. Air sucked from outside the case 15 by the action of the cooling fan 4 flows into this lower space 42. Further, a control substrate 100 for the electric power converter 5 is arranged on a side wall face of the case 15 in which the opening 14, which is an external air intake port, is provided. A cooling fan air stream 107 having passed the cooling fan 4 reaches the right upper space 41b.

Figure 8:
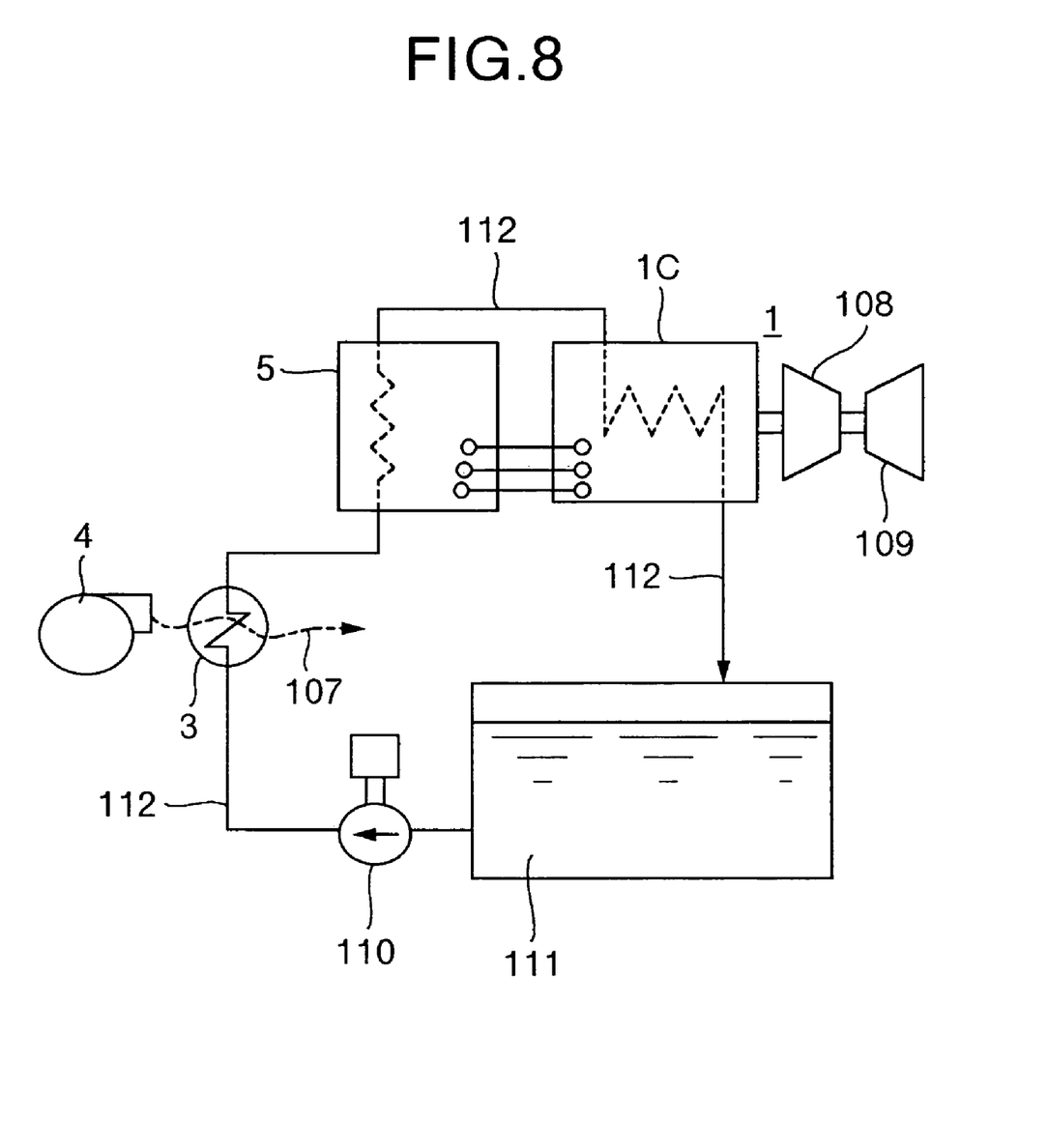
FIG. 8 is a diagram showing a circulating system of cooling water.

FIG. 8 is a diagram showing the circulating system of cooling water in this turbine system. The engine core 1 of this turbine system comprises a turbine 109, a compressor 108 and a generator 1C. The electric power converter 5 is so configured that a power transistor (insulated gate bipolar transistor), one emitting a particularly large quantity of heat among its constituent parts, is cooled by using the cooling water for a stator installed within the generator 1C. And, the cooling water is supplied to the electric power converter 5 and the generator 1C by a circulating system formed of a tank 111 for storing cooling water, a circulating water pump 110 for feeding the cooling water and cooling water piping 112.

The cooling water stored in the tank 111 passes from the circulating water pump 110 to the radiator 3, the electric power converter 5 and the generator 1C via the cooling water piping 112, and returns to the tank 111. The circulating water having absorbed heat from the electric power converter 5 and the generator 1C returns to the tank 111 at a raised temperature, and radiates its heat by way of the radiator 3 provided on the circulating line. The cooling water passing this radiator 3 is caused to exchange heat with the cooling air sucked by the aforementioned cooling fan 4 from outside into the case 15. The cooling water having returned to a low temperature by radiation through the radiator 3 is supplied to the electric power converter 5 to cool the power transistor. While this water-cooling of the power transistor enables the electric power converter to be reduced in size, the quantity of heat radiated from the radiator 3 increases. Therefore, electrical equipments which are constituent parts of the electric power converter 5 deteriorate in reliability if the ambient temperature rises. In order to prevent the electrical equipments from deteriorating in reliability, they should be components resistant to a high-temperature ambience, which do not act erroneously even in a high-temperature ambience.

In this connection, the electric power converter 5 is arranged upstream from the radiator 3 in this embodiment shown in FIG. 7. Since the temperature of the air stream passing the electric power converter 5 is a temperature almost equal to that of the external atmosphere, an external atmospheric air stream 106, which is the cooling air, is made immune from the influence of heat radiation from the radiator 3 by using the arrangement described above. Similarly, since the control substrate 100 of the electric power converter 5 is installed on the side wall face of the case 15 in which the opening 14, which is an external air intake, is provided, the temperature around the control substrate 100 is also close to that of the external atmosphere, and is unaffected by the influence of heat radiation from the radiator 3.

In this embodiment, the electric power converter 5 is installed upstream from the radiator 3 in relation to the stream of air sucked from outside the case. As this makes cooling air guide to the electric power converter 5 immune from the influence of heat radiation from the radiator 3, the surroundings of the electric power converter 5 are maintained at an ambient temperature substantially equal to the temperature of the external atmosphere. Therefore, the cooling of electrical equipments emitting large quantities of heat can be effectively accomplished. As described above, where the arrangement of constituent elements in a gas turbine power generator plant is considered as a package, the electrical equipments including an electric power converter and a reactor can be installed in optimal positions, representing consideration of the ambient temperature requirement of each equipment. Therefore, the electrical parts of the electric power converter 5 can be increased in reliability. Furthermore, since the electrical parts of the electric power converter 5 need not meet specifications for resistance to a high-temperature ambience, the cost of the electric power converter 5 can be reduced. There is a further advantage that, because the power transistor of the electric power converter 5 can be water-cooled, the electric power converter can be reduced in size.

Figure 9:
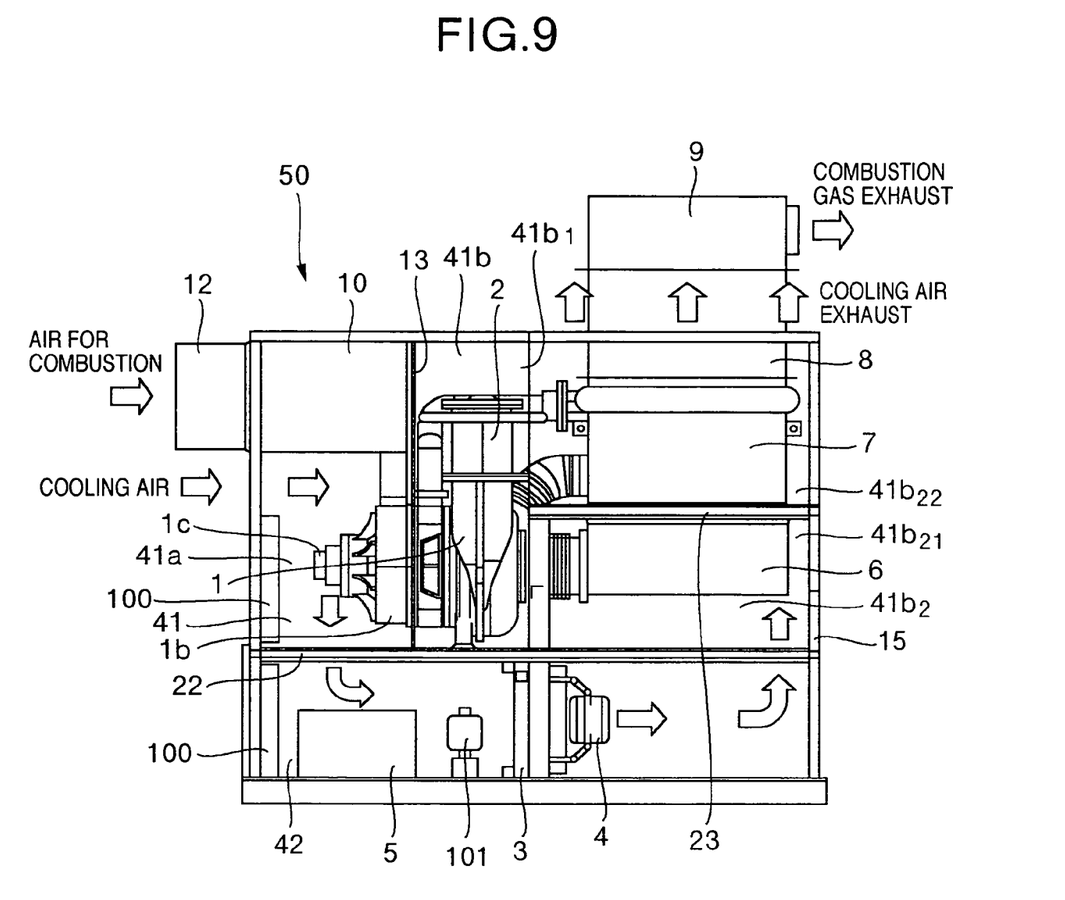
FIG. 9 is a schematic vertical section view of a gas turbine power generator plant according to another embodiment of the invention.

FIG. 9 is a diagram showing another embodiment according to the invention. FIG. 9 shows the same arrangement as what was shown in FIG. 7, but the arrangement of the constituent parts of the electric power converter 5 is further optimized. Among the constituent parts of the electric power converter 5, the electric equipments next greatest to the power transistor in the quantity of heat emission are the reactor and the transformer. The reactor is incorporated into the electric power converter 5 to suppress harmonics, while the transformer is a device to transform the electric power to be fed to turbine auxiliaries including the pump and the fan to voltages respectively matching those auxiliaries. Water-cooling of those equipments would require expensive accessory equipment for securing cooling water, such as a requirement for cooling water close to ultra-pure water, extremely low in electrical conductivity. Furthermore, partly because they emit less heat than the power transistor, they can be cooled with air.

For this reason, in this embodiment shown in FIG. 9, a reactor 101 or a transformer (not shown) is arranged immediately before the radiator 3 on the upstream side. The reactor 101, which emits the greatest quantity of heat among the electrical equipments cooled by the passage of an air stream, is installed immediately before the radiator 3 positioned on the farthest downstream part of the installation space for the electric power converter 5. This arrangement makes it possible to prevent the ambient temperatures of other electrical equipments from being raised under the influence of the heat radiation from the reactor 101. This embodiment provides an advantage of further enhancing the reliability of the electrical equipments of the electric power converter 5.

Figure 10:
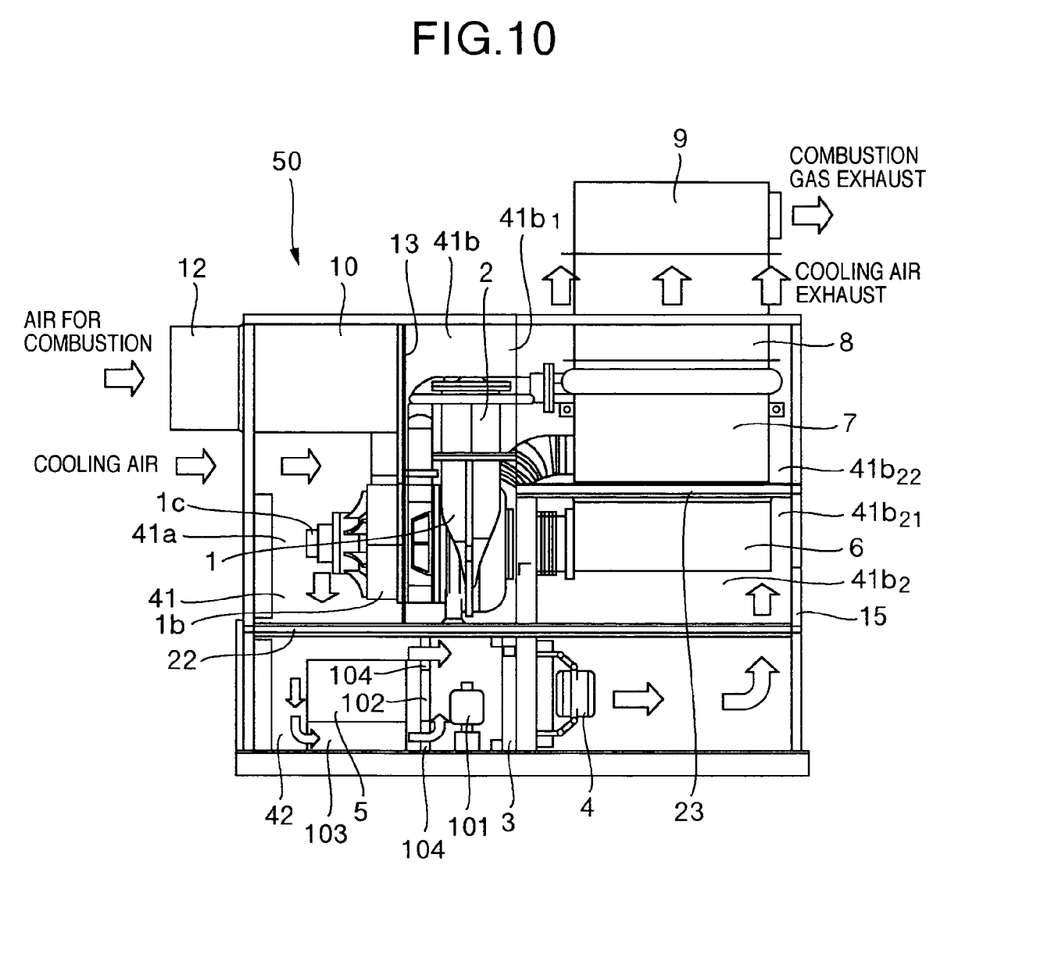
FIG. 10 is a schematic vertical section view of a gas turbine power generator plant according to other embodiment of the invention.

FIG. 10 is a diagram showing another embodiment of the invention. In this embodiment, a heat shield plate 102 in whose upper and lower parts ventilation ports 104 are bored is installed upstream from the reactor 101 shown in FIG. 9 or a transformer (not shown) to separate the reactor 101 and other electrical equipments (the electric power converter, control substrate and so forth) from each other. Further, a space as a lower ventilation channel 103 is provided underneath the electric power converter 5 to improve ventilation. Ventilation can be improved by forming a space in which no object to obstruct the air stream is installed upstream from the electric power converter 5. External air drawn into the case 15 by the action of the cooling fan 4 passes the ventilation port 104 in the lower part of the shield plate 102 from this lower ventilation channel 103, and turned upward in the space in which the reactor 101 is installed.

Around the reactor 101, convection directed upward from underneath is generated by heat radiation from the reactor 101. As a result, the air having flowed in through the lower ventilation channel 103 thrusts up toward the reactor the air whose temperature has been raised by heat radiation from the reactor 101 by reinforcing the aforementioned convection. And, together with the air stream flowing in through the upper ventilation port of the heat shield plate 102, it passes the radiator 3. Further, the presence of the heat shield plate 102 between electrical parts including the electric power converter 5 and the reactor 101 serves to shield other electrical equipments installed upstream from the reactor 101 against the shift of the heat radiated from the reactor 101. In this embodiment, the electric power converter 5 and the reactor 101 can be efficiently cooled by the ventilation channel 103 provided underneath the location of electrical parts of the electric power converter 5 and the heat shield plate 102 arranged upstream from the reactor 101, and there is a further advantage of enabling the heat radiation from the reactor 101 to be diffused.

Figure 11:
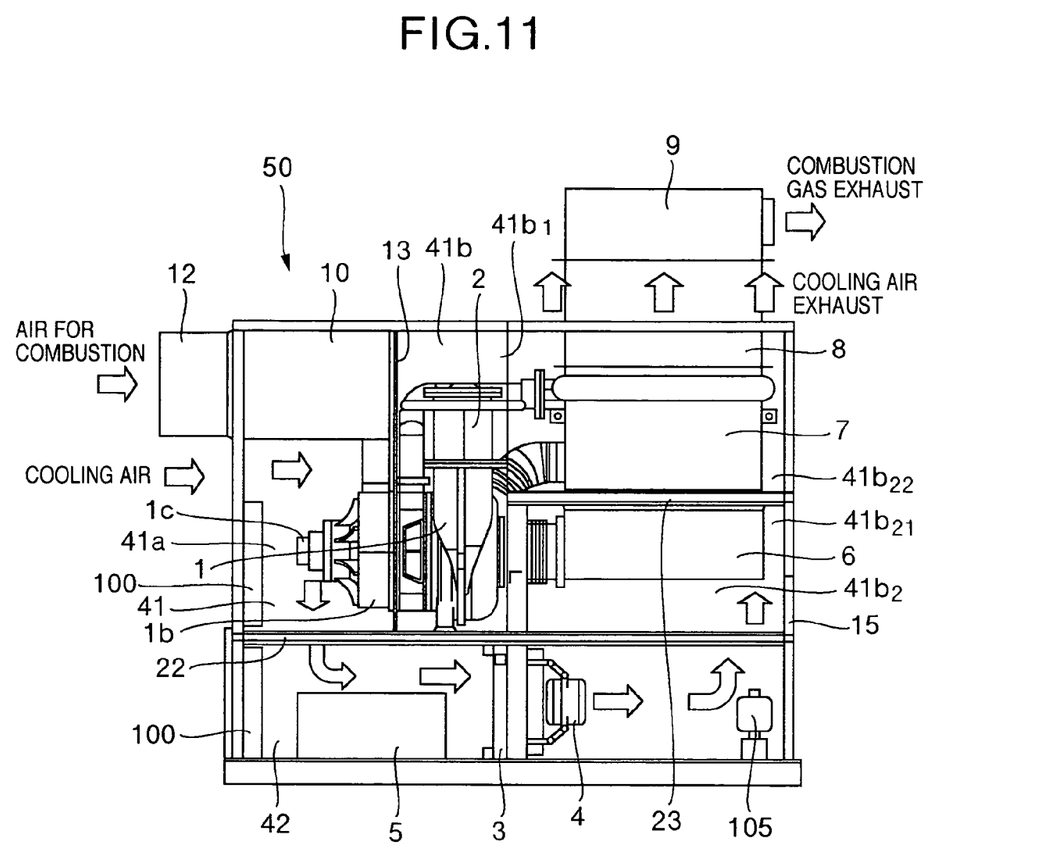
FIG. 11 is a schematic vertical section view of a gas turbine power generator plant according to other embodiment of the invention.

FIG. 11 is a diagram showing another embodiment of the invention. In this embodiment, the reactor (not shown) or a transformer 105 is installed downstream from the cooling fan 4 immediately before a side face opposing a side face provided with the opening 14. The air stream from the cooling fan 4 directly hits the transformer 105 and passes upward through the opening 21. This air stream flows in the same direction as the convection generated by the heat radiation from the reactor, and the transformer 105, as it is installed immediately downstream from the cooling fan 4, is directly exposed to a large volume of air stream. As a result, heat radiation by the transformer 105 can be efficiently discharged outside the case 15 by the air stream from the cooling fan, resulting in an advantage that the temperature in the lower space 42, in which the electric power converter 5 is installed, can be held at a level about equal to the temperature of the external atmosphere.

It should be further understood by those skilled in the art that the foregoing description has been made on embodiments of the invention and that various changes and modifications may be made in the invention without departing from the spirit of the invention and the scope of the appended claims.

The invention claimed is:

1. A gas turbine power generator plant comprising:
    an engine core composed of a generator, a turbine and a compressor;

electrical equipments of said engine core; and a case for housing said engine core and said electrical equipments, wherein a combustion air channel for guiding air for combustion to said engine core and a cooling air channel for guiding cooling air to said electrical equipments are formed as mutually independent channels from intake to exhaust.

2. A gas turbine power generator plant comprising:

an engine core composed of a generator, a turbine and a compressor installed on a same axis;

a combustor for burning air for combustion compressed by said compressor and supplying the air to said turbine;

a radiator for cooling bearing lubricant of said engine core by heat exchange with air;

a cooling fan for ventilating said radiator with cooling air;

an electric power converter for converting electric power generated by said generator; and a case for housing these constituent elements, wherein a combustion air channel passing said compressor, said combustor and said turbine and a cooling air channel passing said radiator, said cooling fan and said electric power converter are formed as mutually independent channels from intake to exhaust.

3. The gas turbine power generator plant according to claim 1, wherein an intake silencer is installed on an intake side of said combustion air channel of said engine core.

4. The gas turbine power generator plant according to claim 3, wherein an exhaust silencer is installed on an exhaust side of said combustion air channel of said engine core.

5. The gas turbine power generator plant according to claim 1, wherein an inside of said case is divided by a partitioning plate into an upper space and a lower space, said engine core is arranged in said upper space, said cooling fan is arranged in said lower space, and an air intake and an exhaust outlet of said cooling air channel are formed in an upper part of said case.

6. The gas turbine power generator plant according to claim 5, wherein said radiator, said cooling fan and said electric power converter are arranged in parallel in said lower space, and said cooling air channel is so formed that cooling air flows through the generator in said upper space, said radiator in said lower space, said cooling fan and said electric power converter in that order.

7. The gas turbine power generator plant according to claim 5, wherein said upper space is divided by a partitioning plate into a first upper space and a second upper space side by side, said generator is arranged in said first upper space, an intake for cooling air is formed in the upper part of the case constituting said first upper space, said turbine is arranged in said second upper space, and an exhaust outlet for cooling air is formed in the upper part of the case constituting said second upper space.

8. The gas turbine power generator plant according to claim 7, wherein said second upper space is partitioned by a partitioning plate into a small auxiliary equipment chamber for arranging small auxiliary equipments and a turbine side space for arranging said turbine, and said cooling air channel is branched into a channel passing said small auxiliary equipment chamber and a channel passing said turbine side space.

9. The gas turbine power generator plant according to claim 8, wherein said small auxiliary equipment chamber is divided by a shelf into a plurality of small auxiliary equipment chambers, and an opening is so formed in said shelf that cooling air flows in series through this plurality of small auxiliary equipment chambers.

10. The gas turbine power generator plant according to claim 1, wherein an intake silencer is installed in the combustion air channel on the intake side of said engine core, and by dividing the inside of the duct of said intake silencer with partitioning plates into a plurality of combustion air channels the route length of each combustion air channel is differentiated.

11. The gas turbine power generator plant according to claim 10, wherein the duct of said intake silencer is bent substantially at a right angle, sound absorbers are provided on both sides of the insides of the divided combustion air channels of said duct, and the surfaces of these two sound absorbers are shaped in matching concave and convex with substantially equal distances between them.

* * * * *